US009836542B2

(12) United States Patent
Kapadia et al.

(10) Patent No.: US 9,836,542 B2
(45) Date of Patent: Dec. 5, 2017

(54) WEB APPLICATION RETRIEVAL AND DISPLAY OF WEB CONTENT BASED INFORMATION WITH WEB CONTENT

(71) Applicant: Microsoft Technology Licensing, LLC, Redmond, WA (US)

(72) Inventors: Ritika Kapadia, Newcastle, WA (US); Sean Obafemi Lyndersay, Sammamish, WA (US); David J. Sheldon, Redmond, WA (US); Kun Cong, Sammamish, WA (US); Meng Lu, Bellevue, WA (US); Liwei Chen, Seattle, WA (US); Jun Yin, Bellevue, WA (US); Michael John Patten, Sammamish, WA (US); Richa Prasad, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 332 days.

(21) Appl. No.: 14/599,923

(22) Filed: Jan. 19, 2015

(65) Prior Publication Data

US 2016/0210362 A1 Jul. 21, 2016

(51) Int. Cl.
*G06F 17/30* (2006.01)

(52) U.S. Cl.
CPC .. *G06F 17/30864* (2013.01); *G06F 17/30867* (2013.01)

(58) Field of Classification Search
CPC .............. G06F 17/30864; G06F 17/30; G06F 17/30575; G06F 17/30867

(Continued)

(56) References Cited

U.S. PATENT DOCUMENTS 7,962,444 B2 6/2011 Maciocci
2007/0288473 A1 12/2007 Mukherjee et al.
(Continued)

FOREIGN PATENT DOCUMENTS

WO 2004079522 A2 9/2004

OTHER PUBLICATIONS

"International Search Report and Written Opinion Issued in PCT Application No. PCT/US2016/012780", dated May 11, 2016, 11 Pages.

(Continued)

*Primary Examiner* — Isaac M Woo

(57) ABSTRACT

A service maintains information regarding one or more aspects of Web content, such as Web pages, that can be accessed by a computing device. The same service or a different service (e.g., a digital assistant) also maintains information regarding the user of the computing device. When a user navigates to Web content using a Web application, such as a Web browser, the services are accessed to obtain information regarding the Web content navigated to, information regarding the user, and/or user selectable tasks or actions. The Web application displays the obtained information to the user along with the Web content. The Web application displays the obtained information without altering the obtained Web content. Optionally, the Web application displays an indication that additional information regarding the Web content is available, and displays the obtained information (e.g., automatically or in response to receiving a user input request to display that additional information).

20 Claims, 15 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 2011/0252342 A1 | 10/2011 | Broman | |
| 2012/0036137 A1 | 2/2012 | Naidu et al. | |
| 2012/0215798 A1* | 8/2012 | Burris ............... | G06F 17/30864 707/755 |
| 2012/0323898 A1 | 12/2012 | Kumar et al. | |
| 2013/0144854 A1 | 6/2013 | Pantel et al. | |
| 2013/0191376 A1 | 7/2013 | Zhiyanov et al. | |

OTHER PUBLICATIONS

"Second Written Opinion", Application No. PCT/US2016/012780, dated Nov. 15, 2016, 6 pages.

"Configuring Related Content, Related Actions, and Layout", Retrieved From: <http://docs.oracle.com/cd/E38689_01/pt853pbr0/eng/pt/tprt/task_ConfiguringRelatedContent_RelatedActions_AndLayout.html>, Feb. 2013, 20 pages.

"Mobile/Fennec/Extensions/Userinterface—MozillaWiki", Retrieved From: <https://wiki.mozilla.org/Mobile/Fennec/Extensions/UserInterface> Sep. 3, 2014, Aug. 27, 2011, 7 pages.

"Overview—Google Chrome", Retrieved From: <https://developer.chrome.com/extensions/overview> Sep. 2, 2014, Feb. 28, 2014, 9 pages.

DXIT, "Buttons, Popups and Badges (Browser Actions)", Retrieved From: <https://dev.opera.com/extensions/tut_browser_actions.html> Sep. 9, 2014, Jun. 9, 2014, 6 pages.

"International Preliminary Report on Patentability", Application No. PCT/US2016/012780, dated Apr. 13, 2017, 7 pages.

* cited by examiner

WEB APPLICATION RETRIEVAL AND DISPLAY OF WEB CONTENT BASED INFORMATION WITH WEB CONTENT

BACKGROUND

As computing technology has advanced, computers have become increasingly interconnected. This allows users to access the Web and gain access to an enormous amount of information. While having access to such large amounts of information is beneficial to users, it is not without its problems. One such problem is that the amount of information available can be overwhelming to users, making it difficult for users to find the information they desire and leading to user frustration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a Web application a user input identifying Web content to access is received. The identified Web content is obtained, and one or more information services are accessed to obtain previously gathered additional information regarding the Web content or the user. The one or more information services can take various different forms (for example, a network search service that obtains information regarding the various Web content and/or a digital assistant that assists a user in performing various operations). The previously gathered additional information is presented by the Web application with the Web content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
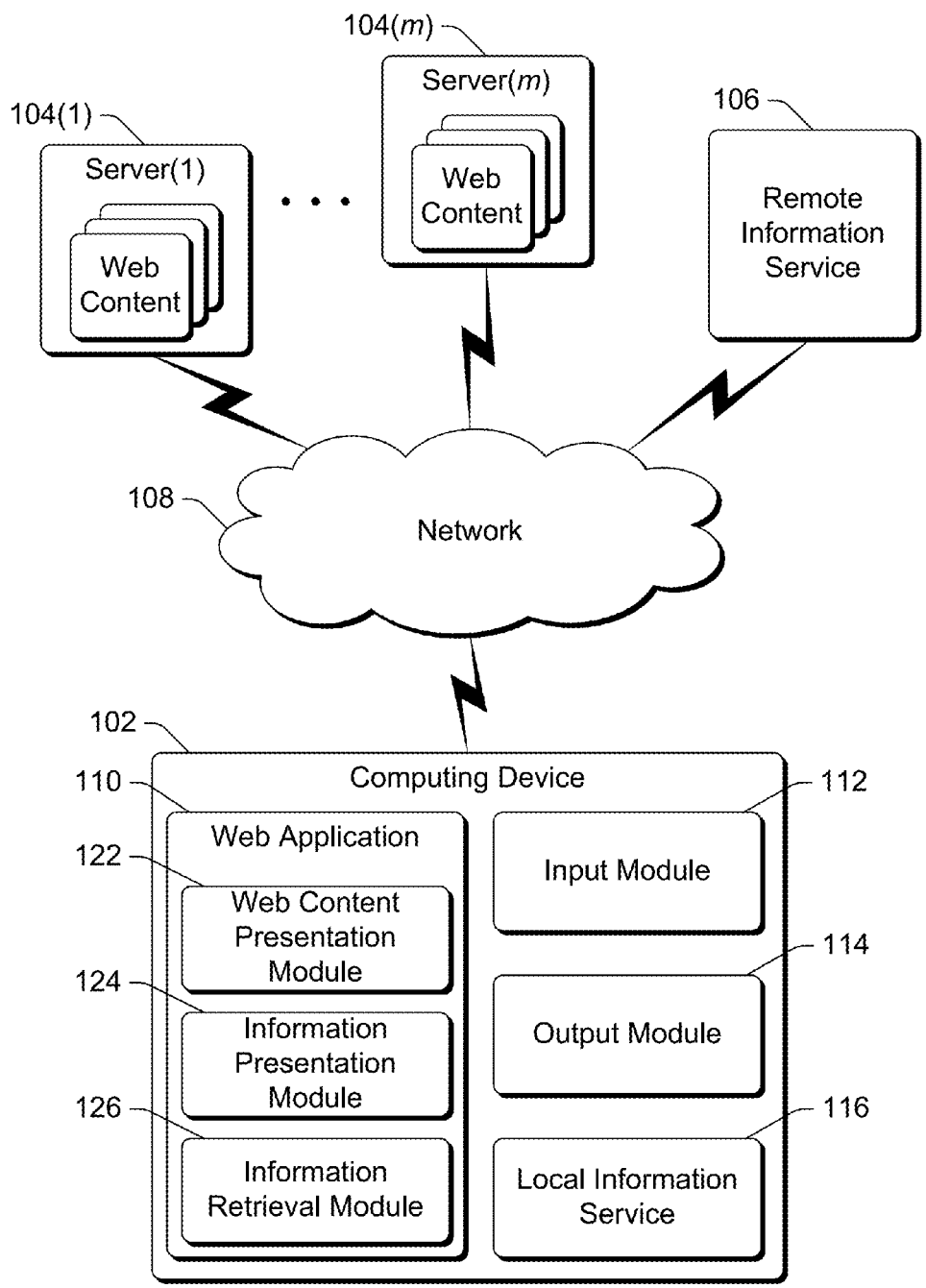
FIG. 1 illustrates an example system implementing the Web application retrieval and display of Web content based information with Web content in accordance with one or more embodiments.

Web application retrieval and display of Web content based information with Web content is discussed herein. A service can maintain information regarding Web content, such as Web pages, that can be accessed by a computing device. The service maintains different information for different Web content, the information regarding particular Web content describing one or more aspects of the Web content. For example, for Web content that is a Web page for a restaurant, the information regarding that Web content may be an address of the restaurant, customer reviews of the restaurant, a menu of the restaurant, an indication that the Web page describes a restaurant, additional tasks or actions that can be taken (e.g., make a dinner reservation at the restaurant, setting a calendar reminder regarding an event at the restaurant), and so forth.

The same service or a different service can also maintain information regarding the user of the computing device, the information regarding a user describing one or more aspects (which can include characteristics) of the user. It should be noted that this information regarding the user is private content maintained for the user, and is not publicly accessible. Various different information can be maintained regarding the user, such as types of food the user prefers, products or stores the user enjoys, travel plans of the user, the current geographical location of the user, the home address of the user, the work address of the user, and so forth.

A user can navigate to different Web content (e.g., Web pages) using a Web application, such as a Web browser. Each time the user navigates to particular Web content one or more services are accessed to obtain additional information regarding the Web content navigated to and/or information regarding the user. The Web application displays the obtained additional information to the user along with the Web content. The obtained additional information is displayed independently of the display of the Web content—the Web content is not altered by the display of the additional information, and the Web content need have no knowledge of (and typically has no knowledge of) this obtained additional information. The Web application displays the obtained additional information without altering the obtained Web content. Optionally, the Web application displays an indication that additional information regarding the Web content is available, and displays the obtained additional information in response to receiving a user input request to display the additional information.

The obtained additional information can take various different forms. For example, the obtained additional information can be additional characteristics of the Web content, such as a description of hours that a restaurant is open, a map to a store, and so forth. By way of another example, the obtained additional information can be one or more user-selectable actions that can be performed, such as accessing additional Web content (e.g., a menu of a restaurant or navigational directions to a store), providing user-assisting tasks (e.g., allowing a user to check in for an upcoming flight), and so forth.

For example, using the techniques discussed herein, when a Web page is shown by a Web browser, multiple services are referenced and the user is provided with additional information specific to that Web page and the user. In addition, the entity of the Web page (the company, business, service, event, etc. that the web page describes) is detected and additional details about that entity are displayed. E.g., if the user navigates to a restaurant Web site, the name of the restaurant is known and additional details specific to the restaurant can be displayed, including location, map, driving directions, hours, menu, parking, ratings, and so forth. In addition to just additional information about the restaurant, various helpful tasks can be provided to the user including setting a reminder, making a reservation, inviting a friend, and so forth. Furthermore, the information displayed can be modified based on known personal information regarding the user (e.g., the user's likes, dislikes, friends, etc.). E.g., information regarding the user's restaurant reservation can be displayed, or if the user follows a gluten free or vegetarian diet then appropriate items from the menu can be highlighted or recommended to the user. These techniques provide additional value to the user due to all of this information being pulled together from multiple sources and presented to the user in an easy to digest format. Key information the user is expected to want to see and tasks that would make the user more productive are provided to the user, saving the user from having to access multiple sites and applications to accomplish the same task.

The techniques discussed herein improve the usability of the computing device by making additional information available to users and thus reducing the amount of user interaction with the computing device in order for the user to obtain their desired information. For example, when a user navigates to a Web page of a restaurant, additional information describing the restaurant can be obtained and displayed to the user along with the display of the Web page, allowing the user to quickly see the restaurant's menu, make reservations at the restaurant through third party services, see customer reviews of the restaurant on third party services, and so forth. The user can make a selection from this additional information, reducing the number of additional inputs on the part of the user to get to the menu. Reducing the amount of user interaction results in reduced network accesses and network bandwidth usage. Reducing the amount of user interaction also results in reduced usage of the computing device and thus energy savings of the computing device.

FIG. 1 illustrates an example system 100 implementing the Web application retrieval and display of Web content based information with Web content in accordance with one or more embodiments. System 100 includes a computing device 102 that can communicate with one or more (m) servers 104 and optionally a remote information service 106 via a network 108. The network 108 can be a variety of different networks, including the Internet, a local area network (LAN), a phone network, an intranet, other public and/or proprietary networks, combinations thereof, and so forth.

The computing device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, watch), an entertainment device (e.g., an entertainment appliance, a set-top box communicatively coupled to a display device, a game console), a television or other display device, an automotive computer, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The servers 104 can each be a variety of different computing devices capable of hosting Web content that can be retrieved and displayed by a Web application of the computing device 102. Similar to the discussion of computing device 102, each of the servers 104 can be a variety of different types of devices, ranging from a full resource device with substantial memory and processor resources to a low-resource device with limited memory and/or processing resources.

The remote information service 106 gathers information regarding the Web content hosted by the servers 104 and/or information regarding one or more users of the computing device 102. Although illustrated as a single service, the remote information service 106 can be implemented as multiple services (e.g., one service gathering information regarding the Web content hosted by the servers 104, and another service gathering information regarding one or more users of the computing device 102). The remote information service 106 can be implemented using one or more computing devices each of which can be, similar to the discussion of computing device 102, a variety of different types of devices, ranging from a full resource device with substantial memory and processor resources to a low-resource device with limited memory and/or processing resources.

The computing device 102 includes a Web application 110, an input module 112, an output module 114, and a local information service 116. The user input module 112 receives user inputs from a user of the computing device 102. User inputs can be provided in a variety of different manners, such as by pressing one or more keys of a keypad or keyboard of the device 102, pressing one or more keys of a controller (e.g., remote control device, mouse, track pad, etc.) of the device 102, pressing a particular portion of a touchpad or touchscreen of the device 102, making a particular gesture on a touchpad or touchscreen of the device 102, and/or making a particular gesture on a controller (e.g., remote control device, mouse, track pad, etc.) of the device 102. User inputs can also be provided via other physical feedback input to the device 102, such as tapping any portion of the device 102, an action that can be recognized by a motion detection or other component of the device 102 (such as shaking the device 102, rotating the device 102, bending or flexing the device 102, etc.), and so forth. User inputs can also be provided in other manners, such as via voice or other audible inputs to a microphone, via motions of hands or other body parts observed by an image capture device, and so forth.

The output module 114 generates, manages, and/or outputs content for display, playback, and/or other presentation. This content can be created by the output module 114 or obtained from other modules or programs of the computing device 102 such as the Web application 110. This content can be, for example, a display or playback portion of a user interface (UI), Web content, additional information displayed along with Web content, and so forth. The content can be displayed or otherwise played back by components of the computing device 102 (e.g., speakers, interactive display devices, etc.). Alternatively, the output module 114 can generate one or more signals that are output to other devices or components (e.g., speakers, display devices, etc.) that are separate from the computing device 102.

The local information service 116 gathers information regarding the Web content hosted by the servers 104 and/or information regarding one or more users of the computing device 102. Although illustrated as a single service, the local information service 116 can be implemented as multiple services (e.g., one service gathering information regarding the Web content hosted by the servers 104, and another service gathering information regarding one or more users of the computing device 102). The local information service 116 can operate in conjunction with the remote information service 106, such as by operating as a local cache of information obtained from the remote information service 106. Alternatively, the local information service can operate independently of the remote information service 106.

The Web application 110 obtains and displays or otherwise presents Web content from the servers 104. In one or more embodiments, the Web application 110 is a Web browser and the Web content hosted by the servers 104 are Web pages. Alternatively, the Web application 110 can be other types of applications that obtain Web pages or other Web content from the servers 104, such as audio/video playback applications, electronic book or magazine readers, and so forth. It should be noted that, however, rather than being an application that is downloaded as Web content and run within a Web browser or other application, the Web application 110 is an application running on the computing device 102 that obtains and displays (or otherwise presents) Web content from the servers 104.

The Web application 110 includes a Web content presentation module 122, an information presentation module 124, and an information retrieval module 126. The Web content presentation module 122 receives user input to navigate to particular Web content (e.g., by entry of an identifier (e.g., a uniform resource locator (URL)) of the Web content, by selection of a hyperlink to the Web content, by input of a back or forward command, by selection of favorite or bookmarked content, etc.). The Web content presentation module 122 manages accessing the navigated-to Web content, as well as the retrieval and display (and/or other presentation, such as audible playback) of the Web content from the servers 104.

The information retrieval module 126 manages the retrieval of additional information regarding Web content that is navigated to. This additional information is obtained from the local information service 116 and/or the remote information system 106.

The information presentation module 124 manages the display (and/or other presentation, such as audible playback) of the additional information obtained by the information retrieval module 126. It should be noted that some of the additional information displayed by the information presentation module 124 may include user-selectable information (e.g., hyperlinks to Web content), and a user selection of such information is a request to navigate to the Web content represented by that information. It should also be noted that the information presentation module 124 displays or otherwise presents the additional information independently of the display of the Web content. The Web content is not altered by the display or other presentation of the additional information. The display or other presentation of the additional information is information displayed or otherwise presented along with (concurrently with) the Web content—it does not alter the Web content, the source code of the Web content (e.g., the hypertext markup language or other markup language source code of the Web content), and the Web content need have no knowledge (and typically has no knowledge) that the additional information is displayed or otherwise presented.

The information retrieval module 126 and the information presentation module 124 operate together to obtain and present information that has been gathered by one or more information services. Each information service can gather different information as desired by the information service. As an information service grows and obtains additional information, this information is made available to the Web application 110. The information is presented to the user by the Web application 110 to allow the user to complete a task more quickly or simply improve the user experience (e.g., when browsing the Web).

In one or more embodiments, one information source (e.g., remote information source 106) is a network search service that obtains information regarding the various Web content hosted by the servers 104. For example, for particular Web content A identified by a particular Web content identifier A, the network search service can identify other Web content that references the Web content identifier A and include that other Web content as information regarding the Web content A. By way of another example, the Web content can be analyzed (e.g., a particular Web page and optionally any other Web pages linked to from that Web page can be analyzed) to identify various characteristics of the Web content (e.g., an address, a phone number, recommendations or comments, etc.) that is used as information regarding the Web content. By way of another example, the entity of the Web page (the company, business, service, event, etc. that the web page describes) is determined by the network search service and used as information regarding the Web content. Various algorithms or rules can be applied by the network search service to combine, filter, and so forth the obtained information.

Another information source (e.g., local information source 116) is a digital assistant that assists the user of the computing device 102 in performing various operations. The digital assistant maintains various information regarding the user, such as information describing his or her family and friends (e.g., ages, phone numbers, etc.), information describing his or her calendar or schedule (e.g., meetings, travel planes, etc.), information describing characteristics of the user (e.g., his or her preferences such as clothing preferences or food preferences, his or her age, his or her typical level of physical activity, etc.), information describing locations associated with the user (e.g., the current geographical location of the user, the home address of the user, the work address of the user, etc.), and so forth. This information regarding the user can determined in different manners, such as being received from the user, automatically determined by analyzing the user's actions or movements, and so forth.

The information retrieval module 126 obtains information from both of these information sources, and modifies (e.g., removes, adds to, or changes) the information obtained from the network search service based on the information obtained from the digital assistant. For example, the information obtained from the network search service may identify multiple different menus for a restaurant, the information obtained from the digital assistant may identify the user's food preference as vegetarian, and the information retrieval module 126 can modify the obtained menu to include only vegetarian menu items for the restaurant. By way of another example, the information obtained from the network search service may identify an address for a restaurant, the information obtained from the digital assistant may identify the user's current geographic location, and the information retrieval module 126 can display driving directions and traffic information from the user's current geographic location to the restaurant. By way of yet another example, the information obtained from the network service may indicate that Web content being displayed is a Web page of an airline, the information obtained from the digital assistant may indicate that the user has a ticket for a flight on that airline scheduled to depart in fifteen hours, and the information retrieval module 126 can add a user selectable link or button allowing the user to check in for his or her flight.

In one or more embodiments, the information obtained from the information sources, optionally as modified by the information retrieval module 126, includes one or more contextual tasks or actions that a user can select based on the Web content. These one or more tasks or actions vary based on the particular Web content, and thus are contextual in nature. These tasks or actions can be included as part of the information obtained from an information source, or alternatively can be generated by the information retrieval module 126 based on the information obtained from one or more information sources. For example, an information source may identify a third party reservation service for Web content that is a Web page of a restaurant, and a user selectable link to book a restaurant reservation using that third party reservation service can be displayed by the information presentation module 124. Alternatively, an information source may identify that particular Web content is a Web page of a restaurant, and the information retrieval module 126 can have knowledge of a third party reservation service, and have the information presentation module 124 display a user selectable link to book a restaurant reservation using that third party reservation service.

Additional examples of these tasks or actions include checking a flight (e.g., for Web content that is a Web page of an airline, displaying a user selectable link to a third party flight tracking service or a user selectable link to a flight tracking Web page or service of the airline), purchasing tickets (e.g., for Web content that is a Web page of a professional sports team, displaying a user selectable link to a third party ticket exchange or a user selectable link to a ticket purchasing Web page or service of the professional sports team), inviting a friend (e.g., for Web content that is a Web page of a restaurant or movie theater, displaying a user selectable link to another person known to the user (e.g., the user's spouse or friend, based on information available from the digital assistant) to invite the other person to dinner or to see the movie), setting a reminder (e.g., for Web content that is a Web page for an upcoming concert, displaying a user selectable link to add a reminder to the user's calendar for the date and time of the concert), and so forth.

The information presentation module 124 is discussed herein as displaying or otherwise presenting information to a user of the computing device 102. The information presentation module 124 can also provide the information obtained by the information retrieval module 126 to various other modules or components of the computing device 102. In one or more embodiments, the functionality of the Web application 110 can be expanded by adding one or more plug-in modules (e.g., Web browser extensions) to the Web application 110. The information presentation module 122 can provide the information obtained by the information retrieval module 126 to such plug-in modules, allowing such plug-in modules to operate in accordance with the obtained information.

For example, a Web browser extension may include functionality that reduces the brightness of certain portions of a display device while video content is begin played back in a window. The information obtained by the information retrieval module 126 can identify Web content that includes video content, and provide that information to the Web browser extension, which the Web browser extension can use to determine when to reduce the brightness of certain portions of the display device.

Figure 2:
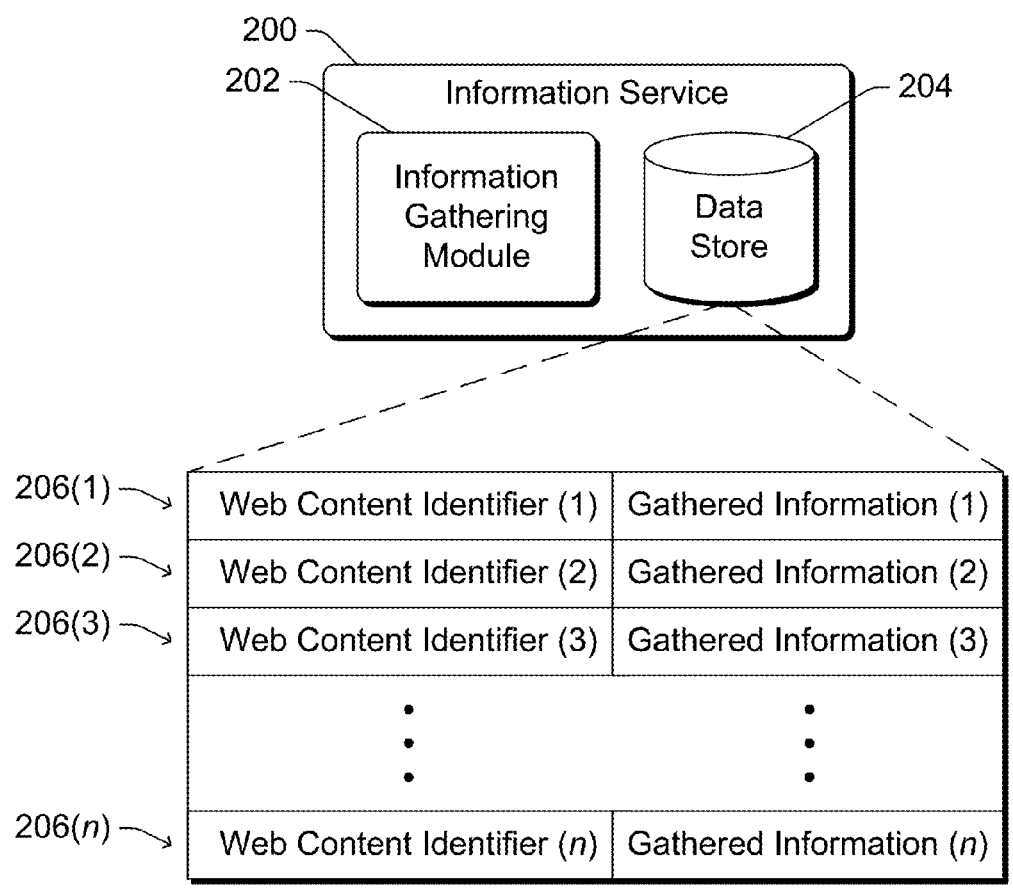
FIG. 2 illustrates an example information service in accordance with one or more embodiments.

FIG. 2 illustrates an example information service 200 in accordance with one or more embodiments. The information service 200 can be a remote information system 106 of FIG. 1 or a local information service 116 of FIG. 1. The information service 200 includes an information gathering module 202 and a data store 204. The information gathering module 202 obtains information regarding various different Web content from various different sources. The information gathering module 202 can obtain information regarding Web content from a server hosting the Web content, from another service or server that references the Web content (e.g., a third party customer review service that references the Web content in certain customer reviews), from an administrator or manager of the Web content, and so forth. The information gathering module 202 can obtain the information regarding Web content at various times, and records the obtained information so that the obtained information can be provided to a Web application (such as the Web application 110 of FIG. 1) when requested. The information gathering module 202 need not gather the information in response to a request for the information from a Web application, rather, the information is already gathered and stored in the data store 204.

The data store 204 is a record of the obtained information regarding Web content. The data store 204 can be implemented as any of a variety of storage devices, such as flash memory, magnetic disk, optical disc, combinations thereof, and so forth. The data store 204 maintains multiple (n) entries 206(1), . . . , 206(n), each entry identifying a Web content identifier and corresponding gathered information. The Web content identifier can take various forms, such as a URL of the Web content. Although illustrated in a table format, it should be noted that the data store 204 can be implemented using any of a variety of different data structures.

Figure 3:
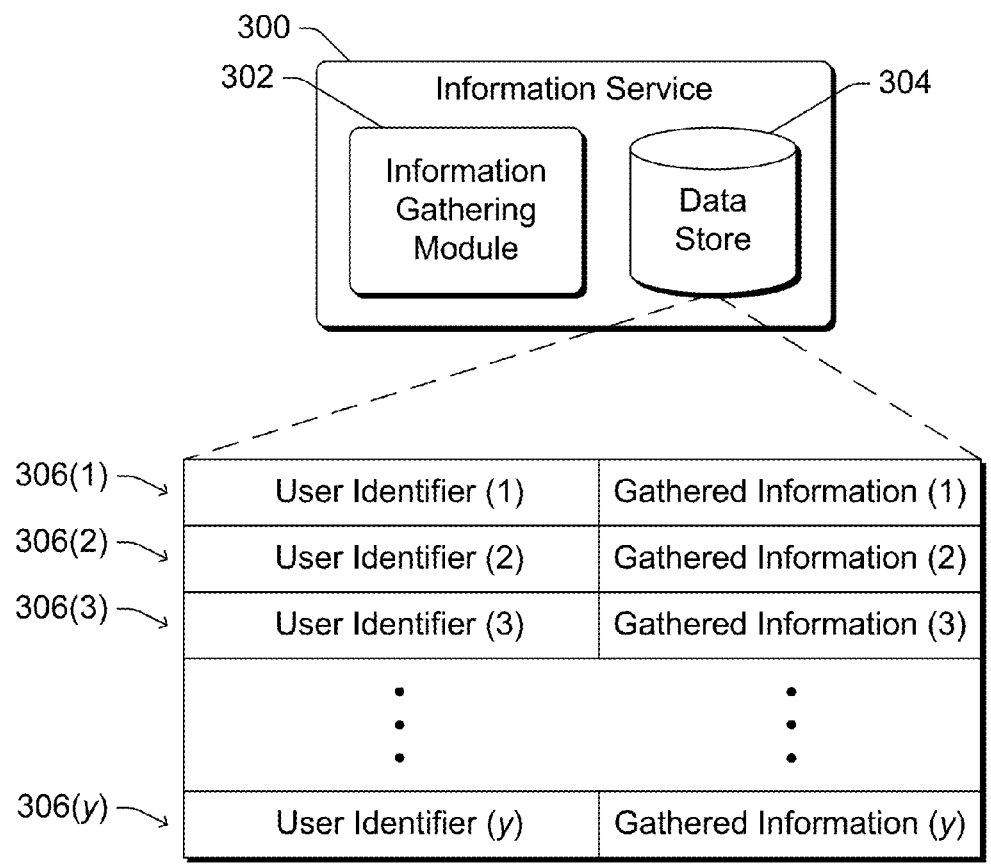
FIG. 3 illustrates another example information service in accordance with one or more embodiments.

FIG. 3 illustrates an example information service 300 in accordance with one or more embodiments. The information service 300 can be a remote information system 106 of FIG. 1 or a local information service 116 of FIG. 1. The information service 300 can be the same information service as the information service 200 of FIG. 2, or alternatively a different information service. The information service 300 includes an information gathering module 302 and a data store 304. The information gathering module 302 obtains information regarding one or more users of a computing device (e.g., the computing device 102 of FIG. 1) from various different sources. The information gathering module 302 can gather information regarding a single user (e.g., the owner of the computing device 102), or alternatively multiple users (e.g., one of multiple users that logs into the computing device 102). The information gathering module 302 can obtain information regarding a user by analyzing the user's behavior (e.g., Web content that is accessed, music that is listened to, recipes that are viewed, etc.), by reviewing personal information that the user has made available (e.g., a list of contacts or friends of the user, a calendar of the user, etc.), from the user himself or herself, and so forth. The information gathering module 302 can obtain the information regarding the one or more users at various times, and records the obtained information so that the obtained information can be provided to a Web application (such as the Web application 110 of FIG. 1) when requested. The information gathering module 302 need not gather the information in response to a request for the information from a Web application, rather, the information is already gathered and stored in the data store 304.

The data store 304 is a record of the obtained information regarding one or more users. The data store 304 can be implemented as any of a variety of storage devices, such as flash memory, magnetic disk, optical disc, combinations thereof, and so forth. The data store 304 maintains multiple (y) entries 306(1), . . . , 306(y), each entry identifying a user identifier and corresponding gathered information. The user identifier can take various forms, such as a name or login identifier of the user. Although illustrated in a table format, it should be noted that the data store 304 can be implemented using any of a variety of different data structures.

In one more embodiments, the information regarding a user is gathered and recorded only after receiving consent from that user to do so. This user consent can be an opt-in consent, where the user takes an affirmative action to request that the information regarding the user be recorded before the information service gathers and records any information regarding that user. Alternatively, this user consent can be an opt-out consent, where the user takes an affirmative action to request that information regarding the user not be recorded. If the user does not choose to opt out of this gathering and recording of information, then it is an implied consent by the user to permit the information recording.

Figure 4:
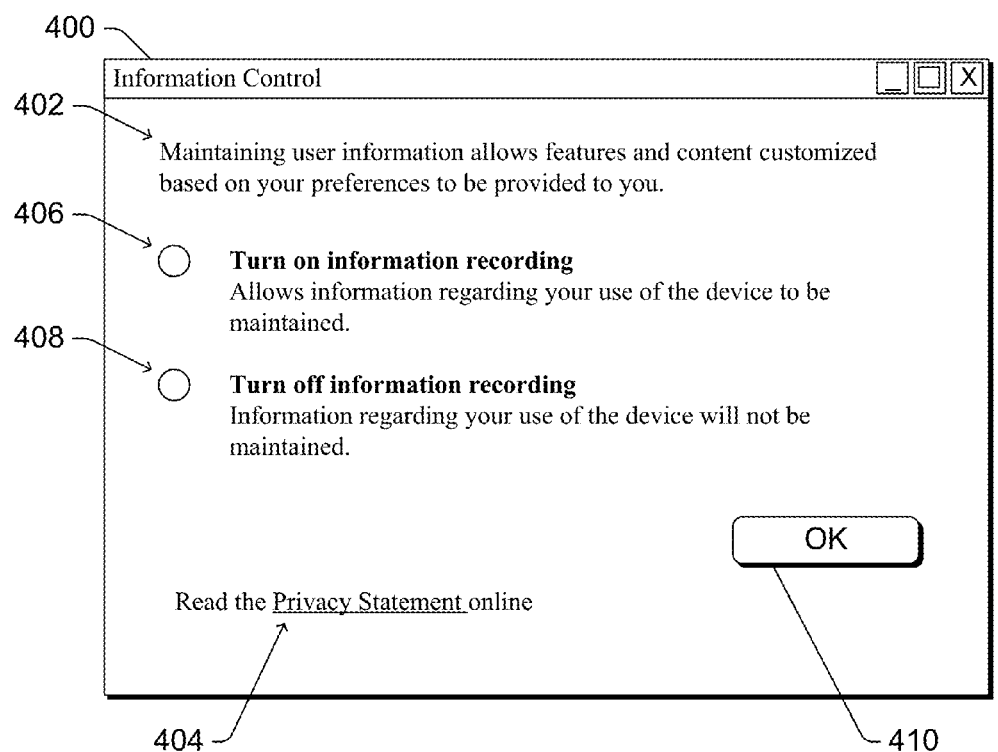
FIG. 4 illustrates an example user interface that can be displayed to a user to allow the user to select whether an information service will record information regarding the user in accordance with one or more embodiments.

FIG. 4 illustrates an example user interface that can be displayed to a user to allow the user to select whether an information service will record information regarding the user in accordance with one or more embodiments. An information control window 400 is displayed including a description 402 explaining to the user why information is being recorded. A link 404 to a privacy statement is also displayed. If the user selects link 404, a privacy statement of service 102 is displayed, explaining to the user how the user's information is kept confidential.

Additionally, the user is able to select a radio button 406 to opt-in to the information recording, or a radio button 408 to opt-out of the information recording. Once a radio button 406 or 408 is selected, the user can select an "OK" button 410 to have the selection saved. It is to be appreciated that radio buttons and an "OK" button are only examples of user interfaces that can be presented to a user to opt-in or opt-out of the information recording, and that a variety of other conventional user interface techniques can alternatively be used. The information service then proceeds to record information or not record information regarding the user in accordance with the user's selection.

Returning to FIG. 1, in response to a user input navigating to Web content, the Web content presentation module 122 obtains and displays or otherwise presents the Web content. Additionally, the information retrieval module 126 sends a request to each of one or more information services (remote information system 106 and/or local information service 116) asking whether the information service has additional information regarding the Web content or the user. An identifier of the Web content (e.g., a URL) and/or the user (e.g., the login name of the user) can be included in the request. In response to the request, the information service returns an indication of whether the information service has additional information regarding the Web content or the user.

If the information service indicates that the information service does not have additional information regarding the Web content and/or the user, then no additional actions with regard to presenting additional information with the Web content are taken. However, if the information service indicates that the information service does have additional information regarding the Web content and/or the user, then the information presentation module 124 displays or otherwise presents an additional information indication to the user. This additional information indication can take various forms, such as a button or an icon on a display, a menu item, an audible tone, and so forth. The additional information indication is an indication to the user of the computing device 102 that additional information is available for presentation to the user if he or she so desires. The additional information indication can be displayed or otherwise presented whenever at least one information service indicates that the information service has additional information regarding the Web content and/or the user, or alternatively can be displayed or otherwise presented only if an information service has additional information regarding the Web content and/or the user, and if one or more additional criteria are satisfied. Various additional criteria can be used, such as an amount of additional information that the information service has exceeds a threshold value, a confidence level or quality of the additional information that the information service has exceeds a threshold value, and so forth.

An additional description can also be displayed or otherwise provided along with the additional information indication (or alternatively the additional description can be used as the additional information indication). The additional description provides an indication to the user of the type of additional information (e.g., a summary of the additional information) that will be displayed in response to selection of the additional information indication. For example, when navigating to a Web page that is a restaurant, the additional description can be "directions, hours and more." By way of another example, when navigating to a Web page that is an airline or other travel site, the additional description can be "flight status, travel conditions and more."

In response to user selection of the additional information indication, the information retrieval module 126 sends a request to the information service for the additional information. A request is sent to each information service that indicated additional information regarding the Web content and/or user was available. The information service sends the additional information to the information retrieval module 126 in response to the request, and the information presentation module 124 displays or otherwise presents the additional information.

The user can then interact with the additional information as desired. For example, the user can read the additional information, select a user-selectable portion of the additional information (e.g., a hyperlink included in the additional information), and so forth. The user can also optionally input a request to close or cease display or other presentation of the additional input. Such a request can be received in a variety of manners, such as by selection of the additional information indication while the additional information is being displayed, selection of a close or cancel button, and so forth.

Alternatively, rather than requesting the additional information in response to user selection of the additional information indication, the request can be sent at other times. For example, the request can be sent in response to receipt from the information service of the indication that the information service has additional information regarding the Web content and/or the user. By way of another example, the request can be included as part of the request asking whether the information service has additional information regarding the Web content or the user. The request can also be sent to each such information service automatically rather than in response to user selection of the additional information indication.

Figure 5:
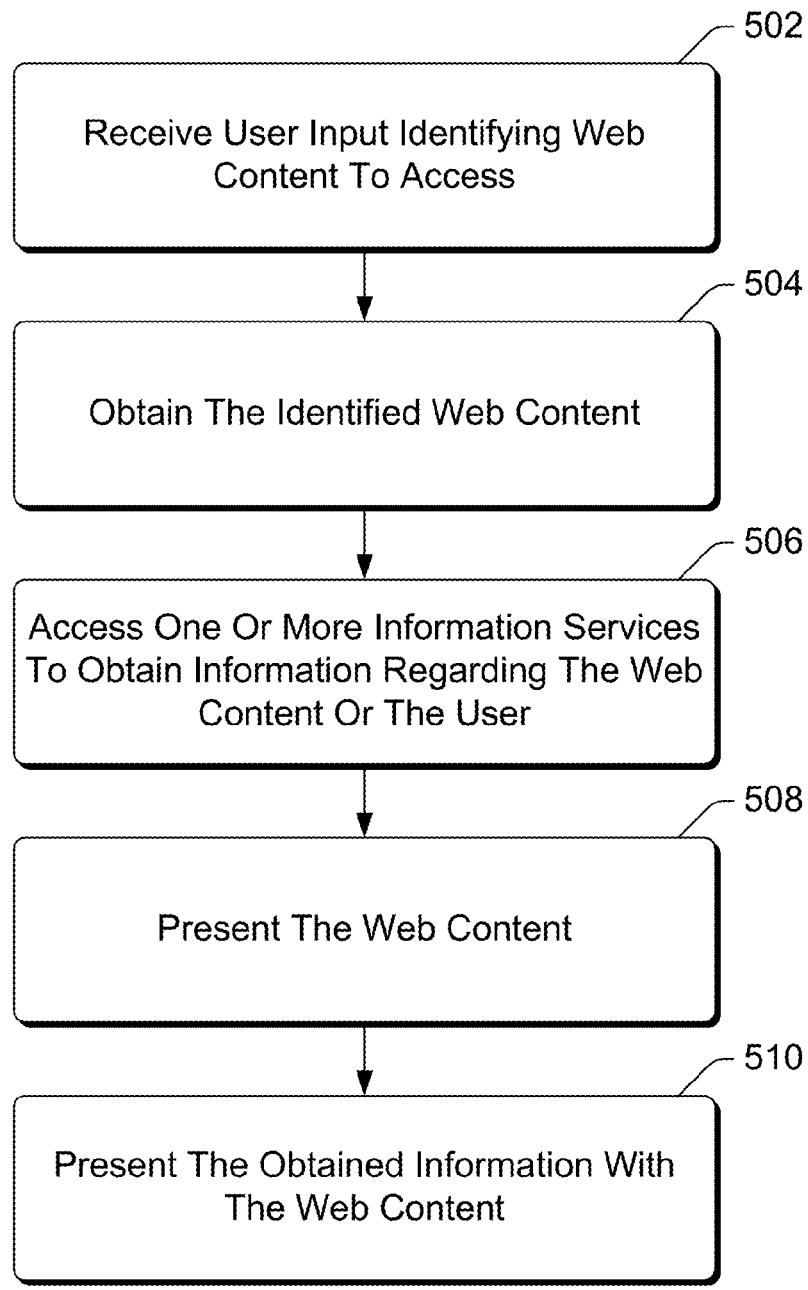
FIG. 5 is a flowchart illustrating an example process for Web application retrieval and display of Web content based information with Web content in accordance with one or more embodiments.

FIG. 5 is a flowchart illustrating an example process 500 for Web application retrieval and display of Web content based information with Web content in accordance with one or more embodiments. Process 500 is carried out by a Web application on a computing device, such as Web application 110 of FIG. 1, and can be implemented in software, firmware, hardware, or combinations thereof. Process 500 is shown as a set of acts and is not limited to the order shown for performing the operations of the various acts. Process 500 is an example process for Web application retrieval and display of Web content based information with Web content; additional discussions of Web application retrieval and display of Web content based information with Web content are included herein with reference to different figures.

In process 500, user input identifying Web content to access is received (act 502). The Web content is identified by user input navigating to the particular Web content.

The identified Web content is obtained (act 504). The identified Web content is obtained from a server as discussed above. Alternatively, situations can arise in which the Web content is cached or otherwise stored in one or more intermediary devices (including a cache memory of the computing device that is running the Web application implementing process 500), and the Web content can be obtained from such an intermediary device.

One or more information services are accessed to obtain information regarding the Web content or the user of the Web application (act 506). These information services can be local information services or remote information services as discussed above. The information can be obtained from the one or more information services in response to the user input identifying the Web content to access, or alternatively in response to user selection of an indication that additional information is available as discussed in more detail below.

The obtained Web content is presented by the Web application (act 508). This presentation can include displaying at least part of the Web content, audibly playing back at least part of the Web content, and so forth.

The obtained information is presented with the Web content (act 510). The obtained information is presented concurrently with the Web content, and this presentation of the obtained information can include, for example, displaying additional descriptive information regarding the Web content, displaying one or more user selectable links or buttons to carry out additional actions or access other Web content, and so forth. The obtained information can be automatically displayed in act 510, or alternatively displayed only in response to a user request that the obtained information be displayed (e.g., user selection of an additional information indication as discussed in more detail below). Whether the obtained information is displayed automatically in act 510 can optionally be determined based on previous user actions (e.g., in response to determining that the user frequently (e.g., greater than a threshold percentage of the time) requests that the obtained information be displayed, the Web application can begin automatically displaying the obtained information).

Figure 6:
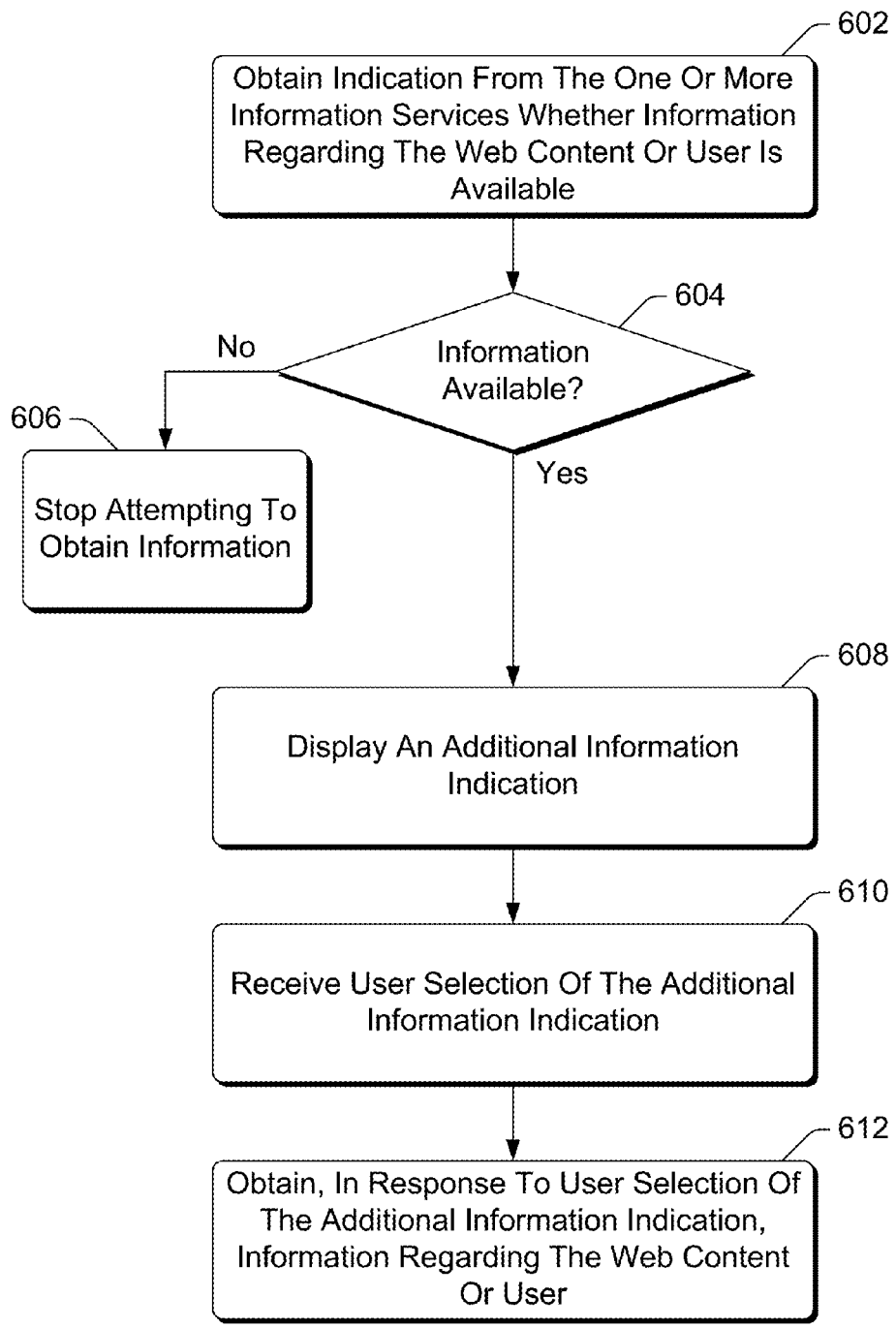
FIG. 6 is a flowchart illustrating an example process for accessing one or more information services to obtain information regarding the Web content or user in accordance with one or more embodiments.

FIG. 6 is a flowchart illustrating an example process 600 for accessing one or more information services to obtain information regarding the Web content or user in accordance with one or more embodiments. Process 600 is carried out by a Web application on a computing device, such as Web application 110 of FIG. 1, and can be implemented in software, firmware, hardware, or combinations thereof. Process 600 implements, for example, act 506 of FIG. 5. Process 600 is shown as a set of acts and is not limited to the order shown for performing the operations of the various acts. Process 600 is an example process for accessing one or more information services to obtain information regarding the Web content or user; additional discussions of accessing one or more information services to obtain information regarding the Web content or user are included herein with reference to different figures.

In process 600, an indication is received from the one or more information services indicating whether information regarding the Web content or user is available (act 602). This indication can be received at different times. In one or more embodiments, the Web application sends a request for the indication to the one or more services in response to the receipt of the user input identifying the Web content to access in act 502 of FIG. 5. Alternatively, the Web application can obtain an indication of Web content and/or users for which additional information is available and maintain a local record (e.g., a cache in memory) of the Web content and/or users for which additional information is available. Maintaining such a local record can reduce network bandwidth usage and power usage by reducing the number of requests for indications of whether information regarding the Web content or user is available that are sent to a remote information service.

A check is made as to whether information regarding the Web content or user is available (act 604). If no such information is available, then the Web application stops attempting to obtain information regarding the Web content or user for the Web content currently being accessed (act 606). In such situations, additional information is not presented with the Web content in act 510 of FIG. 5 because there is no obtained information.

However, if information regarding the Web content or user is available, then an additional information indication is displayed or otherwise presented (act 608). Although typically displayed, the additional information indication can be presented in other manners such as by being played back audibly. The additional information indication is an indication to a user of the Web application that additional information that can be displayed along with the Web content is available.

A user selection of the additional information indication is received (act 610). The user selection can be received as any of a variety of different user inputs as discussed above.

In response to user selection of the additional information indication, the information regarding the Web content or user is obtained from the one or more information services (act 612). The obtained information is then displayed or otherwise presented along with the presentation of the Web content in act 510 of FIG. 5.

FIGS. 7-14 illustrate examples of Web application retrieval and display of Web content based information with Web content. Different examples of Web content and displaying additional information are shown. It should be noted that these are only examples, and that various other Web content and/or additional information can be displayed or otherwise presented.

Figure 7:
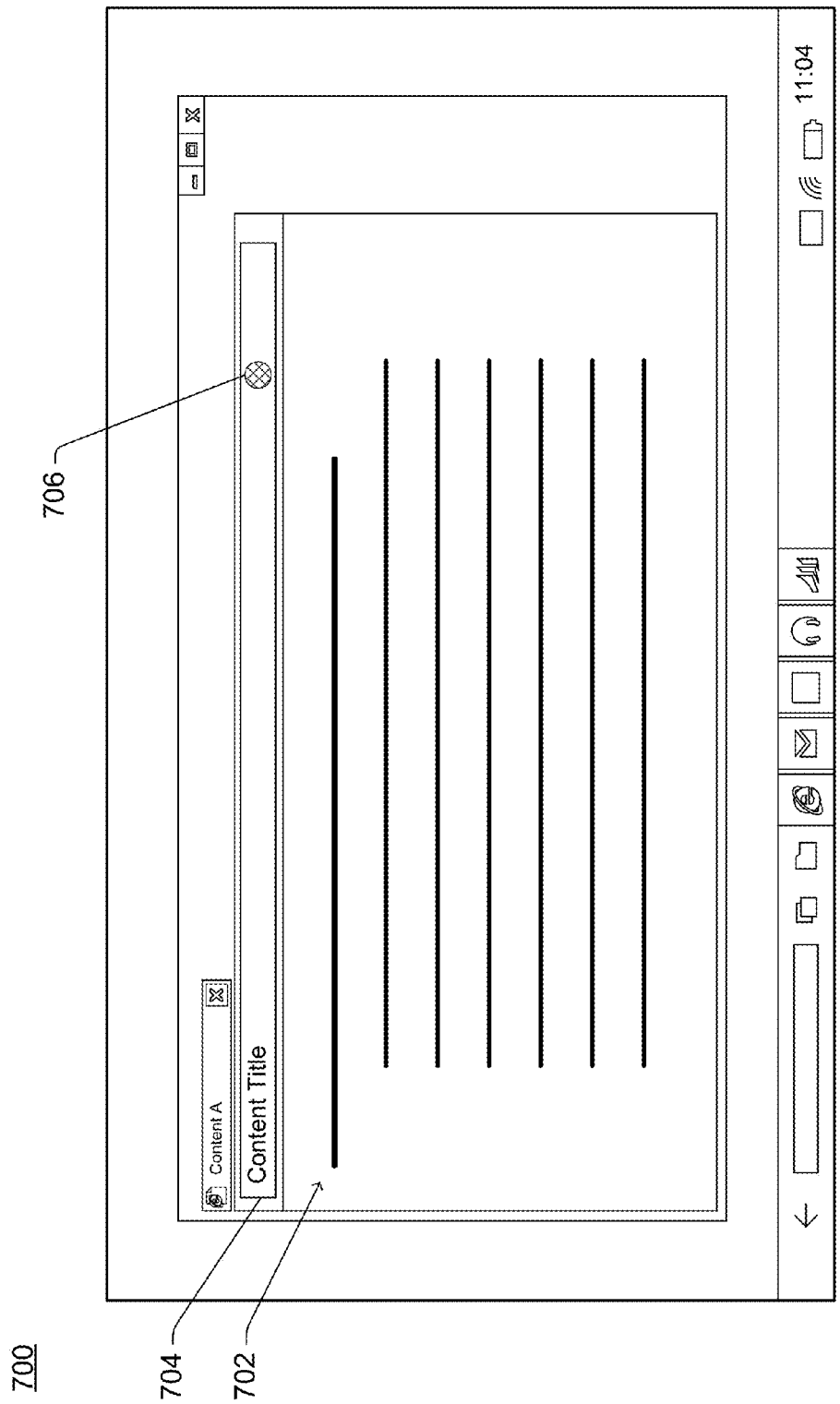
FIGS. 7, 8, 9, 10, 11, 12, 13, and 14 illustrate examples of Web application retrieval and display of Web content based information with Web content.

FIG. 7 illustrates an example 700 of Web application retrieval and display of Web content based information with Web content in accordance with one or more embodiments. A Web application of a computing device displays Web content 702, illustrated as multiple lines (e.g., representing text) in the example 700. A title bar 704 displays a title or name of the Web content, illustrated as "Content Title" in the example 700. An additional information indication 706 is displayed to indicate that additional information regarding the Web content 702 and/or a user of the computing device displaying the Web content 702 is available. The additional information indication 706 is illustrated as a circle or button, although it should be noted that this is an example and that the additional information indication 706 can be displayed as any of a variety of different user-selectable elements, such as buttons of various geometric shapes, icons, tiles, widgets, and so forth.

Figure 8:
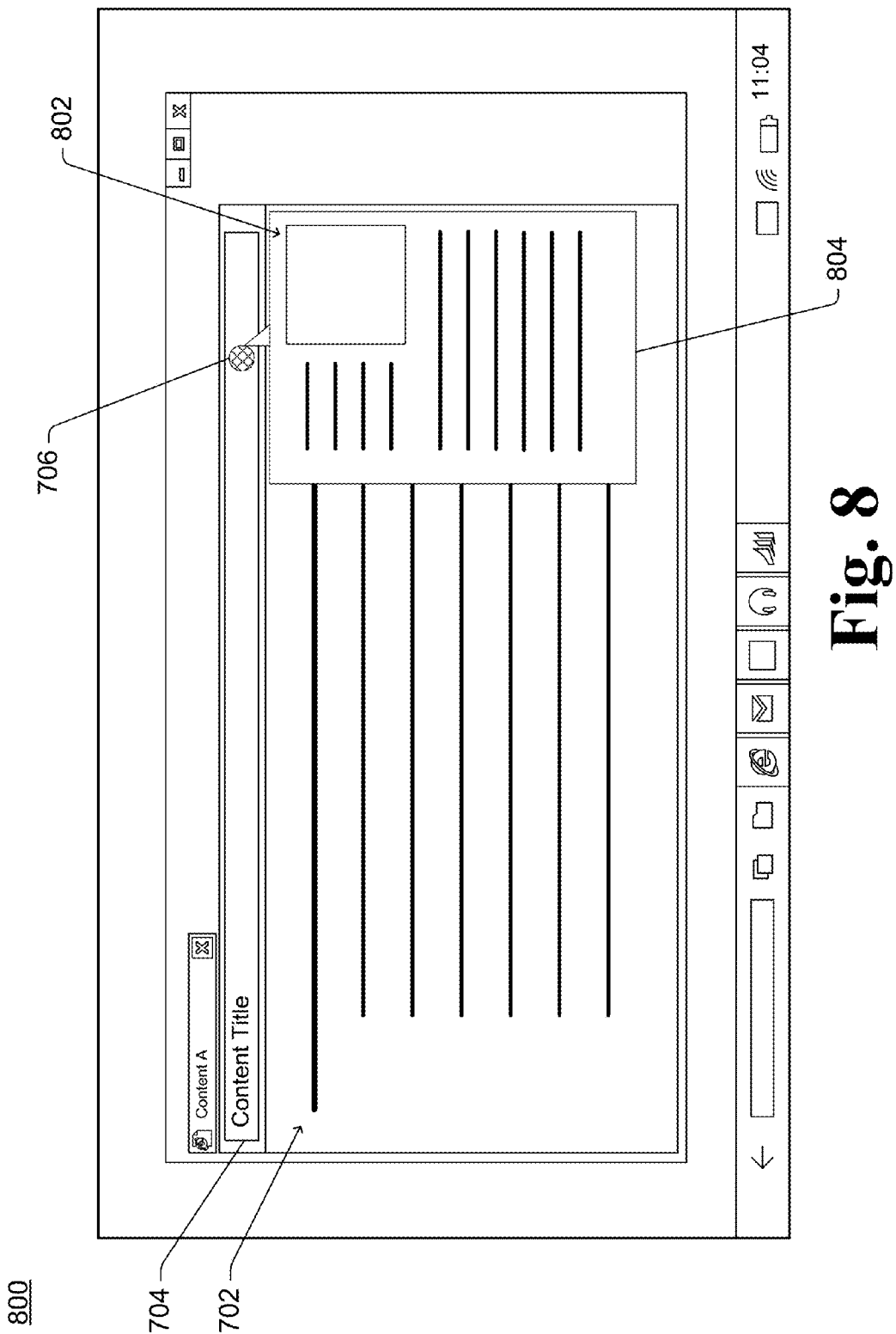

FIG. 8 illustrates an example 800 of Web application retrieval and display of Web content based information with Web content in accordance with one or more embodiments. A Web application of a computing device displays the Web content 702, the title bar 704, and the additional information indication 706 as discussed above with reference to FIG. 7. However, the example 800 illustrates additional information 802 being displayed, such as in response to user selection of the additional information indication 706. The additional information is illustrated as multiple lines (e.g., representing text, hyperlinks, or other user selectable elements) and a box (e.g., representing an image, hyperlink, or other user selectable element) within an additional information presentation area 804.

As illustrated in the example 800, the additional information presentation area 804 is displayed on top of or overlaying the Web content 702, and thus can obscure at least part of the Web content. Alternatively, the additional information presentation area 804 can be at least partially transparent, allowing some of the Web content 702 below the presentation area 804 to be displayed or be visible through the presentation area 804.

The additional information presentation area 804 is illustrated as being adjacent or proximal to the additional information indication 706. It should be noted that this is an example, and that the additional information presentation area 804 can be displayed in other areas or manners. For example, the additional information presentation area 804 can be displayed along the left-hand side of the window displaying the Web content 702, along the top or bottom edge of the window displaying the Web content 702, within a user interface window of the Web application but external to (or at least partially external to) the window in which the Web content 702 is displayed, and so forth. By way of another example, the additional information indication 804 can be displayed with different geometric shapes, such as circles, triangles, and so forth.

Figure 9:
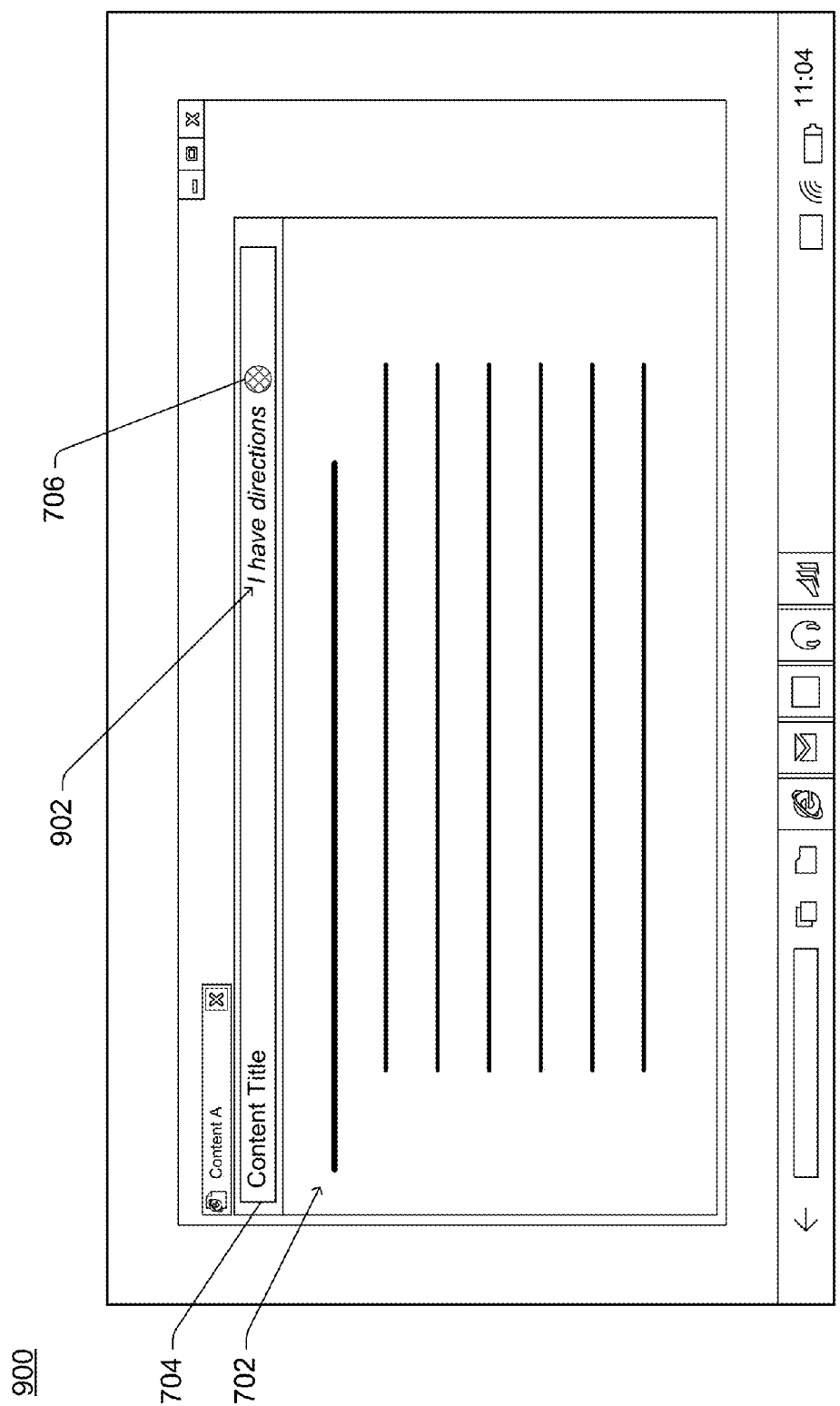

FIG. 9 illustrates an example 900 of Web application retrieval and display of Web content based information with Web content in accordance with one or more embodiments. A Web application of a computing device displays the Web content 702, the title bar 704, and the additional information indication 706 as discussed above with reference to FIG. 7. However, the example 900 illustrates the additional information indication 706 is displayed in conjunction with an additional description 902 of the additional information. The additional description 902 provides an indication to the user of the type of additional information that will be displayed in response to selection of the additional information indication 706.

Figure 10:
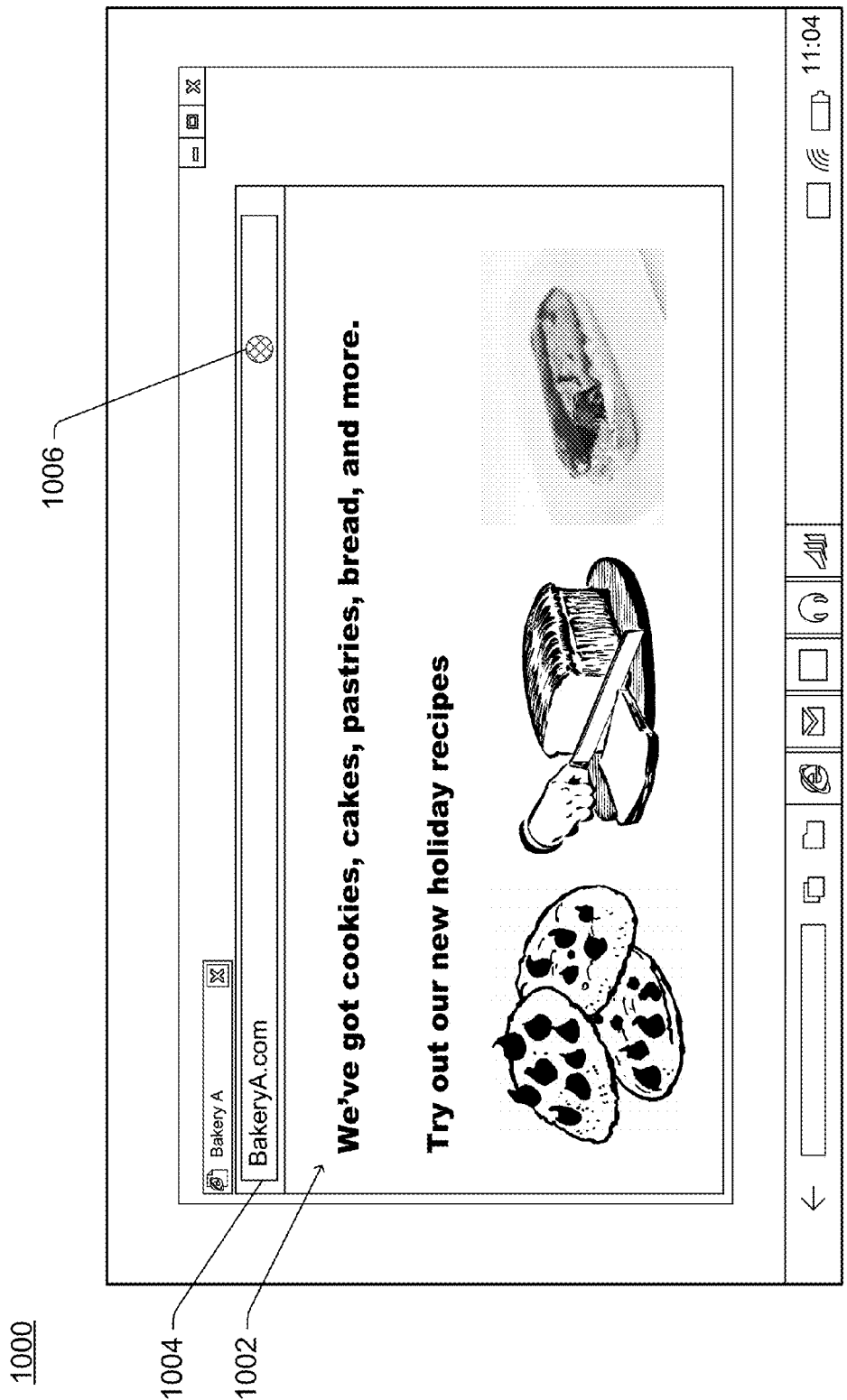

FIG. 10 illustrates an example 1000 of Web application retrieval and display of Web content based information with Web content in accordance with one or more embodiments. A Web application of a computing device displays Web content 1002, illustrated as text and drawings for a bakery shop in the example 1000. A title bar 1004 displays a title or name of the Web content, illustrated as "BakeryA.com" in the example 1000. An additional information indication 1006 is displayed to indicate that additional information regarding the Web content 1002 and/or a user of the computing device displaying the Web content 1002 is available. The additional information indication 1006 is illustrated as a circle or button, although it should be noted that this is an example and that the additional information indication 1006 can be displayed as any of a variety of different user-selectable elements.

Figure 11:
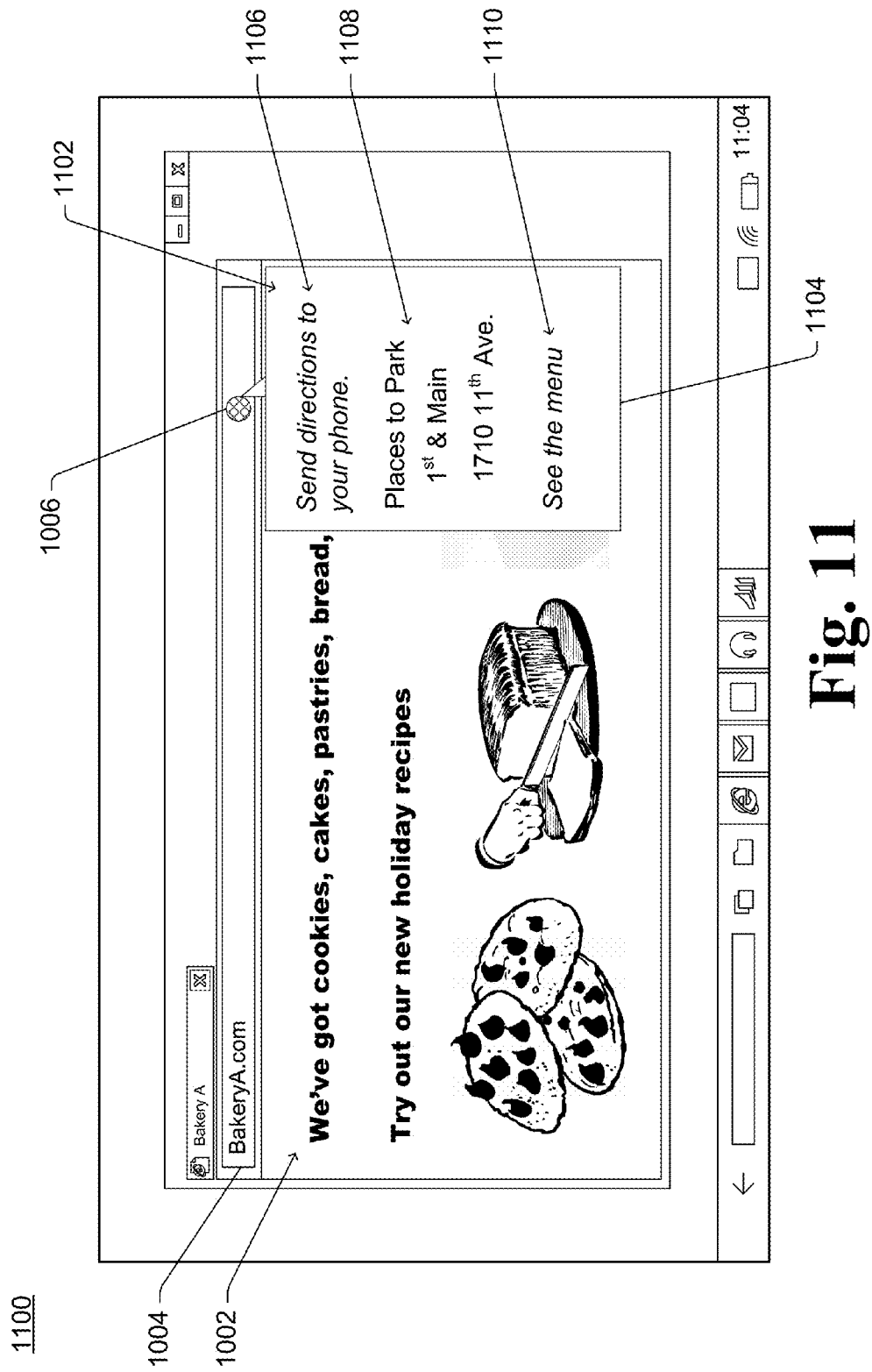

FIG. 11 illustrates an example 1100 of Web application retrieval and display of Web content based information with Web content in accordance with one or more embodiments. A Web application of a computing device displays the Web content 1002, the title bar 1004, and the additional information indication 1006 as discussed above with reference to FIG. 10. However, the example 1100 illustrates additional information 1102 being displayed, such as in response to user selection of the additional information indication 1006. The additional information is illustrated within an additional information presentation area 1104, and is illustrated as a user selectable link 1106 to have directions to the bakery shop sent to the user's phone, information 1108 describing parking locations close to the bakery shop, and a user selectable link 1110 to have a menu for the restaurant displayed. In response to user selection of the link 1106, the Web application sends directions (e.g., driving directions, an address for entry into a global positioning system (GPS), etc.) to the user's phone (e.g., via a Bluetooth or other wireless connection, by using a text or other messaging protocol to send the directions to the phone number of the user, etc.). In response to user selection of the link 1110, the Web application displays a menu of the restaurant. The menu can be displayed in different areas, such as within the additional information presentation area 1104, within a new window of the Web application, in place of the Web content 1002, and so forth.

Thus, as can be seen in the example 1100, various different additional information describing one or more aspects of the Web content 1002 are displayed by the Web application along with the Web content 1002. These one or more aspects include directions to the bakery shop identified in the Web content 1002, places to park near the bakery shop identified in the Web content 1002, and a menu for the bakery shop identified in the Web content 1002.

The additional information can also describe one or more aspects of the Web content 1002 based on characteristics of the user. For example, the menu for the bakery shop identified in the Web content 1002 can be only those menu items that conform to a particular dietary constraint or food preference (e.g., low-sodium menu items, vegetarian menu items, etc.) of the user. The dietary constraints or food preferences of the user is information regarding the user of the computing device obtained from an information service, and the menu items are information regarding the Web content 1002 obtained from the same (or a different) information service.

Figure 12:
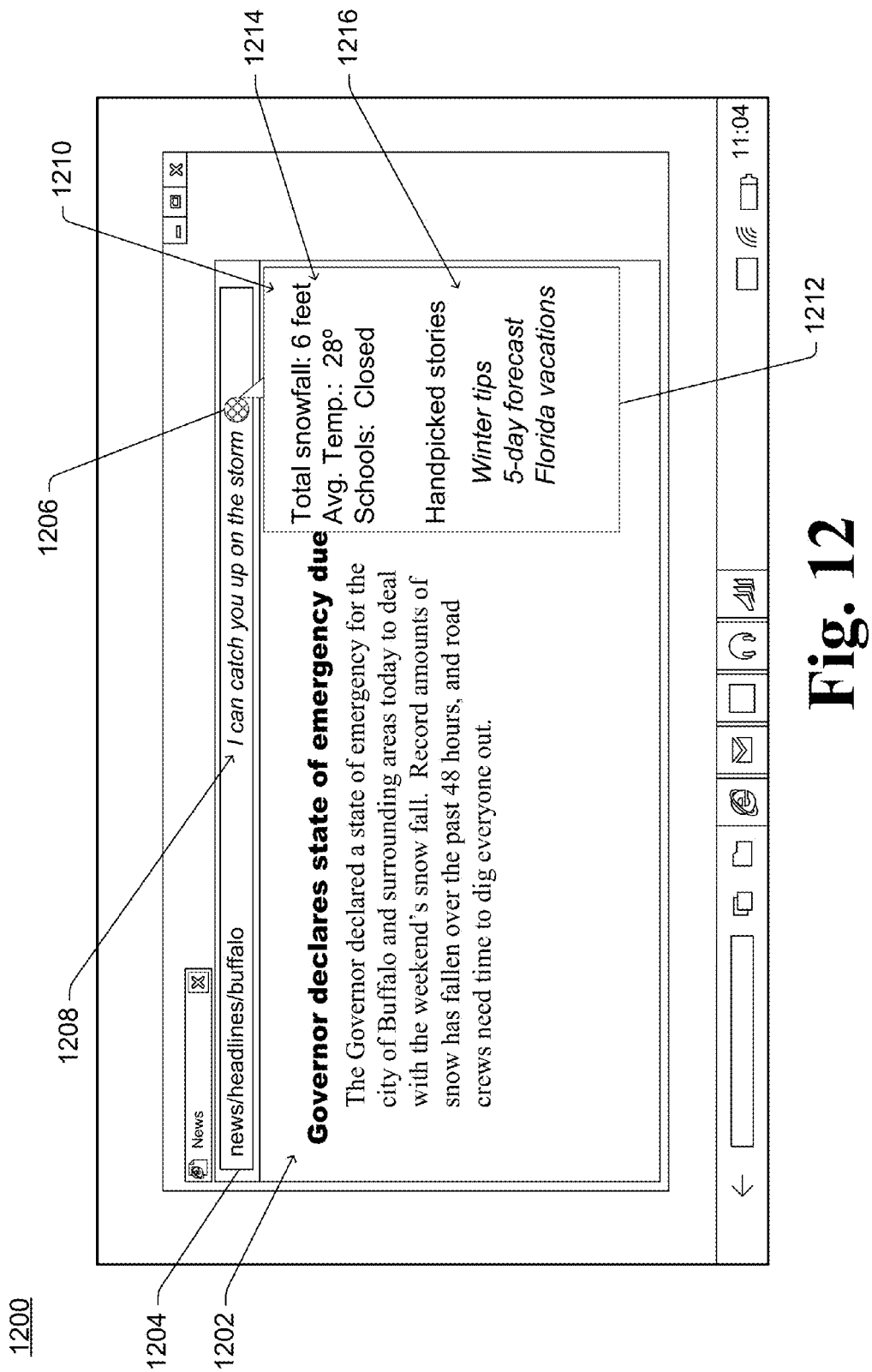

FIG. 12 illustrates an example 1200 of Web application retrieval and display of Web content based information with Web content in accordance with one or more embodiments. A Web application of a computing device displays Web content 1202, illustrated as text for a news article in the example 1200. A title bar 1204 displays a title or name of the Web content, illustrated as "news/headlines/buffalo" in the example 1200. An additional information indication 1206 is displayed to indicate that additional information regarding the Web content 1202 and/or a user of the computing device displaying the Web content 1202 is available. The additional information indication 1206 is illustrated as a circle or button, although it should be noted that this is an example and that the additional information indication 1206 can be displayed as any of a variety of different user-selectable elements. The additional information indication 1206 illustrated in conjunction with an additional description 1208 of the additional information. The additional description 1208 provides an indication to the user of the type of additional information that will be displayed in response to selection of the additional information indication 1206.

The additional information 1210 is illustrated within an additional information presentation area 1212, and is illustrated as a description 1214 of the snowfall discussed in the Web content 1202, and user selectable links 1216 to other Web content having a similar subject matter or related to the Web content 1202. In response to user selection of a link 1216, the Web application displays the web content identified by the selected link 1216. The Web content can be displayed in different areas, such as within the additional information presentation area 1212, within a new window of the Web application, in place of the Web content 1202, and so forth.

Thus, as can be seen in the example 1200, various different additional information describing one or more aspects of the Web content 1002 are displayed by the Web application along with the Web content 1002. These one or more aspects include information describing the subject matter of the Web content 1202, and links to other Web content that are related to and might be of interest to a user of the computing device.

Figure 13:
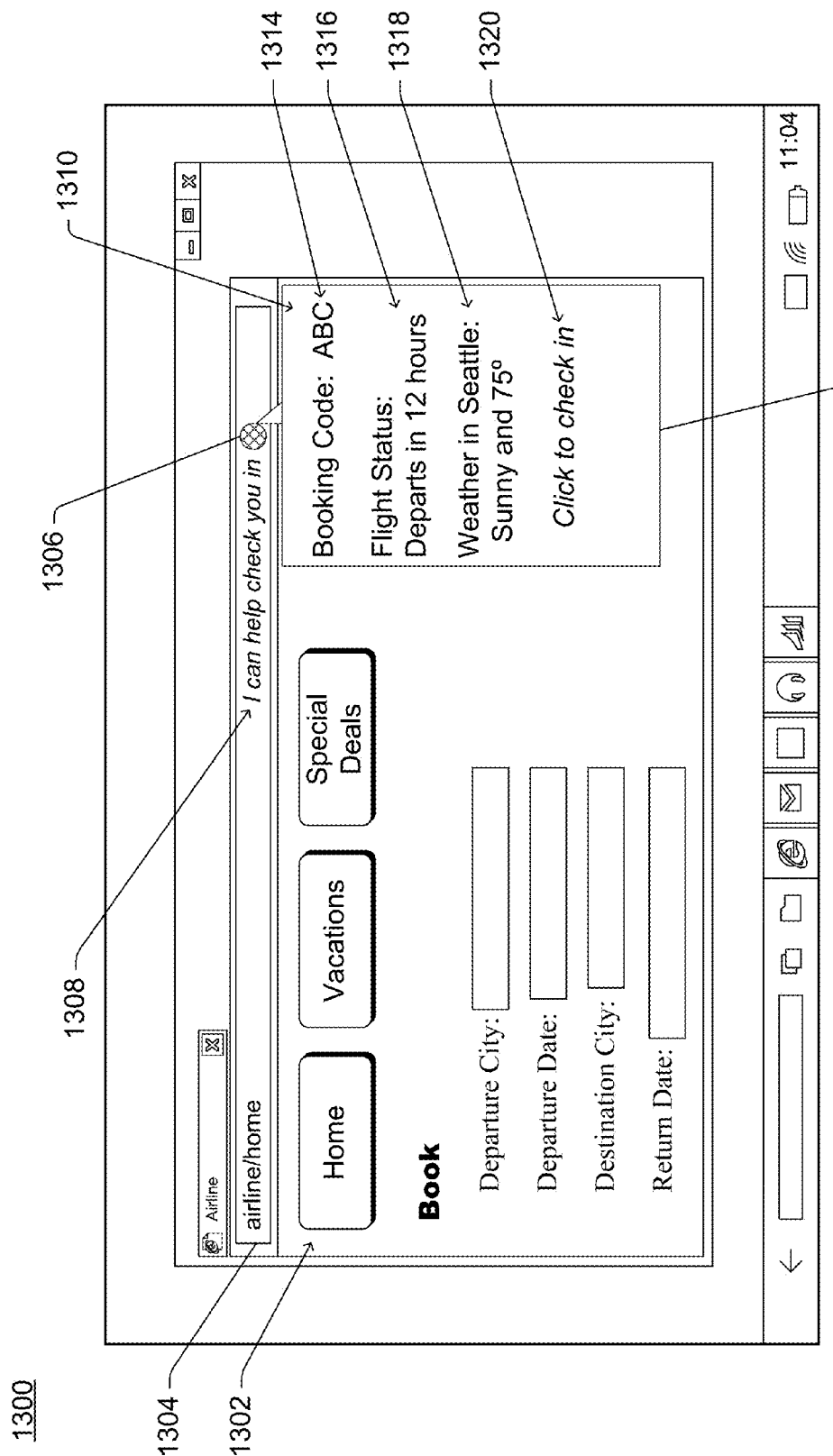

FIG. 13 illustrates an example 1300 of Web application retrieval and display of Web content based information with Web content in accordance with one or more embodiments. A Web application of a computing device displays Web content 1302, illustrated as a home page for an airline in the example 1300. A title bar 1304 displays a title or name of the Web content, illustrated as "airline/home" in the example 1300. An additional information indication 1306 is displayed to indicate that additional information regarding the Web content 1302 and/or a user of the computing device displaying the Web content 1302 is available. The additional information indication 1306 is illustrated as a circle or button, although it should be noted that this is an example and that the additional information indication 1306 can be displayed as any of a variety of different user-selectable elements. The additional information indication 1306 illustrated in conjunction with an additional description 1308 of the additional information. The additional description 1308 provides an indication to the user of the type of additional information that will be displayed in response to selection of the additional information indication 1306.

The additional information 1310 is illustrated within an additional information presentation area 1312, and is illustrated as a description 1314 of an upcoming flight of the user's on the airline described in the Web content 1302, a flight status 1316 of the user's upcoming flight, a weather report 1318 for the destination of the user's upcoming flight, and a user selectable link 1320 for the user to check into his or her upcoming flight on the airline described in the Web content 1302. In response to user selection of a link 1316, the Web application displays the web content identified by the selected link 1316. The Web content can be displayed in different areas, such as within the additional information presentation area 1312, within a new window of the Web application, in place of the Web content 1302, and so forth.

Thus, as can be seen in the example 1300, various different additional information describing one or more aspects of the Web content 1302 based on characteristics of the user are displayed in the additional information presentation area 1312. For example, the upcoming flight information for the user is information regarding the user of the computing device obtained from an information service, and the information regarding the airline is the information describing one or more aspects of the Web content that is obtained from an information service. This information is displayed along with the display of the Web content 1302, providing the user with a link that the user can select to automatically be checked in for his or her flight.

Figure 14:
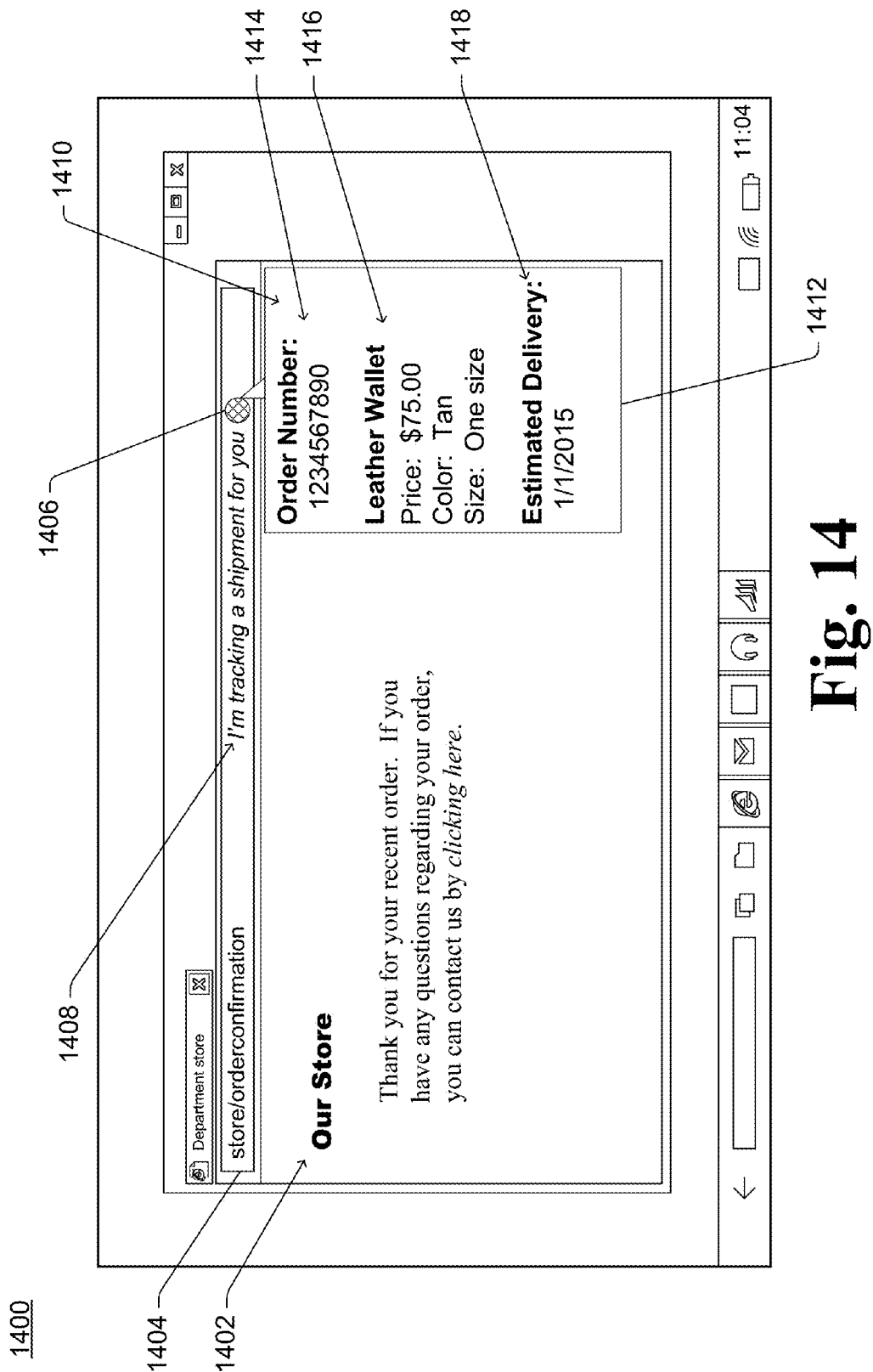

FIG. 14 illustrates an example 1400 of Web application retrieval and display of Web content based information with Web content in accordance with one or more embodiments. A Web application of a computing device displays Web content 1402, illustrated as an order confirmation page for a store in the example 1400. A title bar 1404 displays a title or name of the Web content, illustrated as "store/orderconfirmation" in the example 1400. An additional information indication 1406 is displayed to indicate that additional information regarding the Web content 1402 and/or a user of the computing device displaying the Web content 1402 is available. The additional information indication 1406 is illustrated as a circle or button, although it should be noted that this is an example and that the additional information indication 1406 can be displayed as any of a variety of different user-selectable elements. The additional information indication 1406 illustrated in conjunction with an additional description 1408 of the additional information. The additional description 1408 provides an indication to the user of the type of additional information that will be displayed in response to selection of the additional information indication 1406.

The additional information 1410 is illustrated within an additional information presentation area 1412, and is illustrated as an order number 1414 of a recent product ordered by the user from the store described in the Web content 1402, a description 1416 of the product ordered, and an estimated delivery date 1418 of the product ordered.

Thus, as can be seen in the example 1400, various different additional information describing one or more aspects of the Web content 1402 based on characteristics of the user are displayed in the additional information presentation area 1412. For example, the description of the product ordered is information regarding the user of the computing device obtained from an information service, and the information identifying the store is the information describing one or more aspects of the Web content that is obtained from an information service. This information is displayed along with the display of the Web content 1402, providing the user with a description of the product he or she recently ordered from the store described in the Web content 1402.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 15:
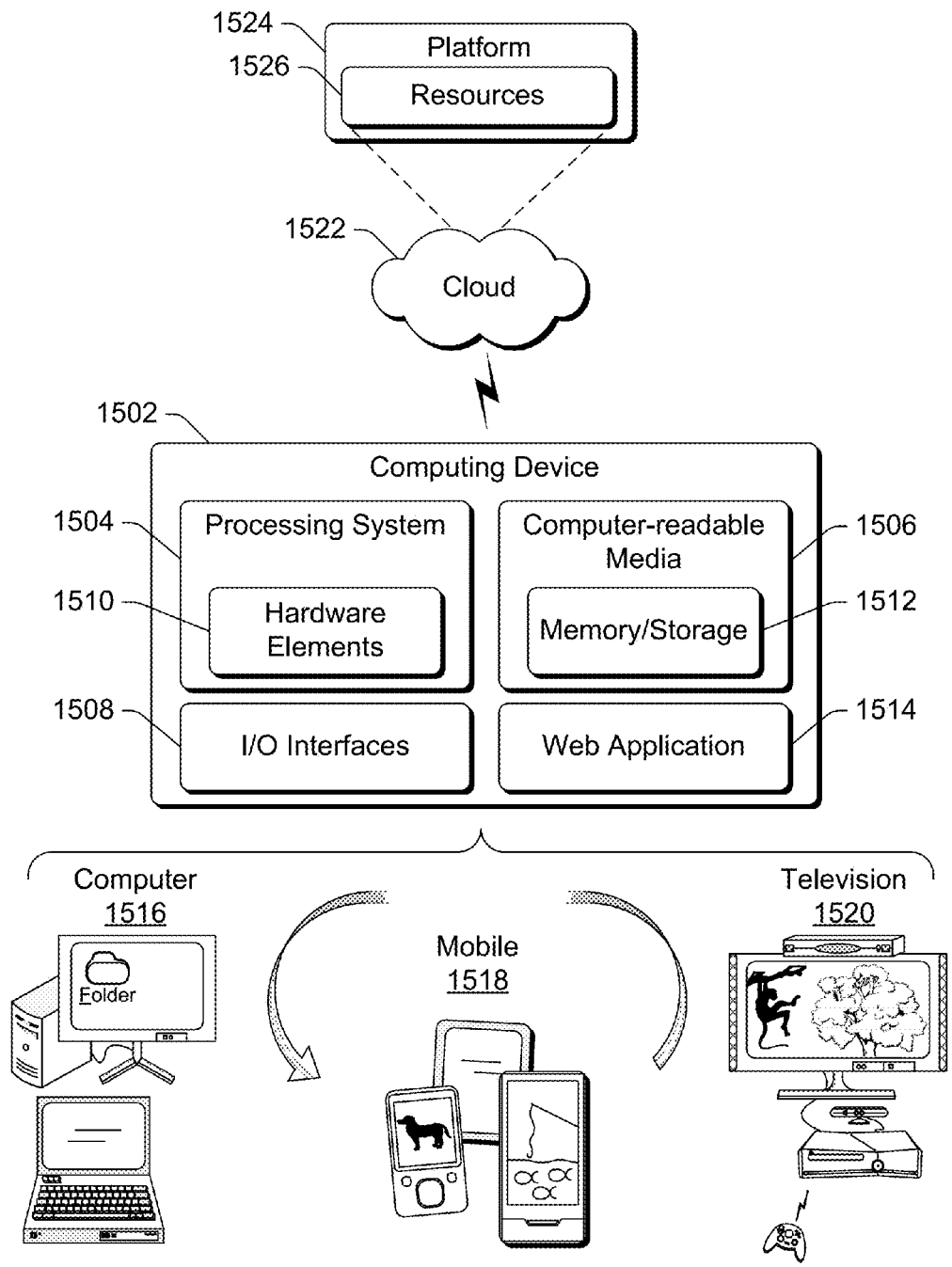
FIG. 15 illustrates an example system generally that includes an example computing device that is representative of one or more systems and/or devices that may implement the various techniques described herein.

FIG. 15 illustrates an example system generally at 1500 that includes an example computing device 1502 that is representative of one or more systems and/or devices that may implement the various techniques described herein. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O Interfaces 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware elements 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1506 is illustrated as including memory/storage 1512. The memory/storage 1512 represents memory/storage capacity associated with one or more computer-readable media. The memory/storage 1512 may include volatile media (such as random access memory (RAM)) and/or nonvolatile media (such as read only memory (ROM), Flash memory, optical disks, magnetic disks, and so forth). The memory/storage 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

The one or more input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1502 may be configured in a variety of ways as further described below to support user interaction.

The computing device 1502 also includes a Web application 1514. The Web application 1514 presents additional information with Web content as discussed above. The Web application 1514 can be, for example, the Web application 110 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1510 and computer-readable media 1506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of modules as a module that is executable by the computing device 1502 as software may be achieved at least partially in hardware, e.g., through use of computer-readable storage media and/or hardware elements 1510 of the processing system. The instructions and/or functions may be executable/operable by one or more articles of manufacture (for example, one or more computing devices 1502 and/or processing systems 1504) to implement techniques, modules, and examples described herein.

As further illustrated in FIG. 15, the example system 1500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1502 may assume a variety of different configurations, such as for computer 1516, mobile 1518, and television 1520 uses. Each of these configurations includes devices that may have generally different constructs and capabilities, and thus the computing device 1502 may be configured according to one or more of the different device classes. For instance, the computing device 1502 may be implemented as the computer 1516 class of a device that includes a personal computer, desktop computer, a multi-screen computer, laptop computer, netbook, and so on.

The computing device 1502 may also be implemented as the mobile 1518 class of device that includes mobile devices, such as a mobile phone, portable music player, portable gaming device, a tablet computer, a multi-screen computer, and so on. The computing device 1502 may also be implemented as the television 1520 class of device that includes devices having or connected to generally larger screens in casual viewing environments. These devices include televisions, set-top boxes, gaming consoles, and so on.

The techniques described herein may be supported by these various configurations of the computing device 1502 and are not limited to the specific examples of the techniques described herein. This functionality may also be implemented all or in part through use of a distributed system, such as over a "cloud" 1522 via a platform 1524 as described below.

The cloud 1522 includes and/or is representative of a platform 1524 for resources 1526. The platform 1524 abstracts underlying functionality of hardware (e.g., servers) and software resources of the cloud 1522. The resources 1526 may include applications and/or data that can be utilized while computer processing is executed on servers that are remote from the computing device 1502. Resources 1526 can also include services provided over the Internet and/or through a subscriber network, such as a cellular or Wi-Fi network.

The platform 1524 may abstract resources and functions to connect the computing device 1502 with other computing devices. The platform 1524 may also serve to abstract scaling of resources to provide a corresponding level of scale to encountered demand for the resources 1526 that are implemented via the platform 1524. Accordingly, in an interconnected device embodiment, implementation of functionality described herein may be distributed throughout the system 1500. For example, the functionality may be implemented in part on the computing device 1502 as well as via the platform 1524 that abstracts the functionality of the cloud 1522.

In the discussions herein, various different embodiments are described. It is to be appreciated and understood that each embodiment described herein can be used on its own or in connection with one or more other embodiments described herein.

A method, implemented in a Web application, of improving usability of a computing device, the method comprising: receiving a user input identifying Web content to access; obtaining the Web content; accessing, from the computing device, one or more information services to obtain previously gathered additional information regarding the Web content or the user; presenting, by the Web application at the computing device, the Web content; and presenting, by the Web application at the computing device, the previously gathered additional information with the Web content to improve usability of the computing device.

Alternatively or in addition to any of the above described methods, any one or combination of: the previously gathered additional information comprising information describing one or more aspects of the Web content, and the presenting the previously gathered additional information comprising displaying the information describing the one or more aspects of the Web content; the previously gathered additional information further comprising information regarding the user, and the presenting the previously gathered additional information further comprising displaying the information describing the one or more aspects of the Web content based on characteristics of the user obtained from the one or more information services; the presenting the previously gathered additional information comprising displaying one or more user selectable contextual tasks or actions based on the Web content; the Web application comprising a Web browser, and the Web content comprising a Web page; further comprising performing the obtaining, accessing, presenting the Web content, and presenting the previously gathered additional information for each different Web content that is accessed; the Web application running on the computing device, and the one or more information services including an information service implemented on the computing device; the Web application running on a first computing device, and the one or more information services including an information service implemented on a second computing device that is accessed by the first computing device via the Internet; the accessing comprising: sending, to the one or more information services, a request for an indication of whether the one or more services have additional information regarding the Web content or user, receiving, from the one or more services, the indication of whether the one or more services have additional information regarding the Web content or user, and displaying, in response to the one or more services having additional information regarding the Web content or user, an additional information indication indicating that additional information regarding the Web content or user is available; further comprising: receiving user selection of the additional information indication, and obtaining, in response to user selection of the additional information indication, the previously gathered additional information regarding the Web content or user; the sending comprising sending the request in response to receiving the user input identifying the Web content to access; the Web application comprising a Web browser, and the method further comprising providing the previously gathered additional information to a browser extension of the Web browser.

A computing device comprising: an input module configured to receive user inputs to the computing device; an output module configured to display content on a display device; a Web application including a Web content presentation module, an information presentation module, and an information retrieval module; the Web content presentation module being configured to obtain and display, via the output module, Web content; the information retrieval module being configured to access one or more information services to obtain previously gathered additional information regarding the Web content or the user; and the information presentation module being configured to improve usability of the computing device by displaying, via the output module, the obtained previously gathered additional information with the Web content.

Alternatively or in addition to any of the above described computing devices, any one or combination of: the information retrieval module being further configured to: send, to the one or more information services, a request for an indication of whether the one or more services have additional information regarding the Web content or user, and receive, from the network search service, the indication of whether the network search service has additional information regarding the Web page, the information presentation module being further configured to: display, in response to the network search service having additional information regarding the Web page, an additional information indication indicating that additional information regarding the Web page is available, and receive user selection of the additional information indication, and the information retrieval module being further configured to obtain, in response to user selection of the additional information indication, the previously gathered additional information regarding the Web page; the Web application comprising a Web browser, and the information presentation module being further configured to provide the previously gathered additional information to a browser extension of the Web browser; the one or more services including a network search service accessed via a data network, and a digital assistant included as part of the computing device; the previously gathered additional information comprising information describing one or more aspects of the Web content as well as characteristics of the user, and the information presentation module being further configured to display the previously gathered additional information by displaying the information describing the one or more aspects of the Web content modified based on the characteristics of the user.

A computer-readable storage medium having stored thereon multiple instructions that implement a Web browser that improves usability of a computing device and that, responsive to execution by one or more processors of a computing device, cause the one or more processors to perform acts comprising: obtaining a Web page navigated to by user input to the computing device; accessing a network search service to obtain previously gathered additional information regarding the Web page; accessing a digital assistant to obtain previously gathered additional information regarding the user; presenting, by the Web browser, the Web page; and presenting, by the Web browser, the previously gathered additional information regarding the Web page and the user with the Web page to improve usability of the computing device.

Alternatively or in addition to any of the above described computer-readable storage medium, any one or combination of: the acts further comprising: sending, to the one or more information services, a request for an indication of whether the one or more services have additional information regarding the Web content or user, receiving, from the network search service, the indication of whether the network search service has additional information regarding the Web page, displaying, in response to the network search service having additional information regarding the Web page, an additional information indication indicating that additional information regarding the Web page is available, receiving user selection of the additional information indication, and obtaining, in response to user selection of the additional information indication, the previously gathered additional information regarding the Web page; the acts further comprising performing the obtaining, the accessing the network search service, the accessing the digital assistant, the presenting the Web page, and the presenting the previously gathered additional information regarding the Web page and the user for each different Web page that is navigated to by user input to the computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a Web application, the method comprising:
   receiving a user input identifying Web content to access;
   obtaining the Web content;
   accessing one or more information services to obtain previously gathered additional information regarding the Web content or user, the accessing including:
      sending, to the one or more information services, a request for an indication of whether the one or more information services have additional information regarding the Web content or the user;
      receiving, from the one or more information services, the indication of whether the one or more information services have additional information regarding the Web content or the user; and
      displaying, in response to the one or more information services having additional information regarding the Web content or the user, an additional information indication indicating that additional information regarding the Web content or the user is available;
   presenting, by the Web application, the Web content; and
   presenting, by the Web application, the previously gathered additional information with the Web content.

2. The method of claim 1, the previously gathered additional information comprising information describing one or more aspects of the Web content, and the presenting the previously gathered additional information comprising displaying the information describing the one or more aspects of the Web content.

3. The method of claim 2, the previously gathered additional information further comprising information regarding the user, and the presenting the previously gathered additional information further comprising displaying the information describing the one or more aspects of the Web content based on characteristics of the user obtained from the one or more information services.

4. The method of claim 1, the presenting the previously gathered additional information comprising displaying one or more user selectable contextual tasks or actions based on the Web content.

5. The method of claim 1, the Web application comprising a Web browser, and the Web content comprising a Web page.

6. The method of claim 1, further comprising performing the obtaining, accessing, presenting the Web content, and presenting the previously gathered additional information for each different Web content that is accessed.

7. The method of claim 1, the Web application running on a computing device, and the one or more information services including an information service implemented on the computing device.

8. The method of claim 1, the Web application running on a first computing device, and the one or more information services including an information service implemented on a second computing device that is accessed by the first computing device via the Internet.

9. The method of claim 1, the one or more information services comprising at least one local information service and a network search service.

10. The method of claim 1, further comprising:
    receiving user selection of the additional information indication; and
    obtaining, in response to user selection of the additional information indication, the previously gathered additional information regarding the Web content or user.

11. The method of claim 1, the sending comprising sending the request in response to receiving the user input identifying the Web content to access.

12. The method of claim 1, the Web application comprising a Web browser, and the method further comprising providing the previously gathered additional information to a browser extension of the Web browser.

13. A computing device comprising:
    an input module configured to receive user inputs to the computing device;
    an output module configured to display content on a display device;
    a Web application including a Web content presentation module, an information presentation module, and an information retrieval module;
    the Web content presentation module being configured to obtain and display, via the output module, Web content;
    the information retrieval module being configured to access one or more information services to obtain previously gathered additional information regarding the Web content or the user and further configured to:
        send, to the one or more information services, a request for an indication of whether the one or more information services have additional information regarding the Web content or the user, and
        receive, from the one or more information services, the indication of whether the one or more information services has additional information regarding the Web content or the user; and
    the information presentation module being configured to display, via the output module and in response to the one or more information services having additional information regarding the Web content or the user, an additional information indication indicating that additional information regarding the Web content or the user is available and the obtained previously gathered additional information with the Web content.

14. The computing device of claim 13,
    the information presentation module being further configured to
        receive user selection of the additional information indication; and
    the information retrieval module being further configured to obtain, in response to user selection of the additional information indication, the previously gathered additional information regarding the Web page.

15. The computing device of claim 13, the Web application comprising a Web browser, and the information presentation module being further configured to provide the previously gathered additional information to a browser extension of the Web browser.

16. The computing device of claim 13, the one or more services including a network search service accessed via a data network, and a digital assistant included as part of the computing device.

17. The computing device of claim 13, the previously gathered additional information comprising information describing one or more aspects of the Web content as well as characteristics of the user, and the information presentation module being further configured to display the previously gathered additional information by displaying the information describing the one or more aspects of the Web content modified based on the characteristics of the user.

18. A computer-readable storage medium having stored thereon multiple instructions that implement a Web browser and that, responsive to execution by one or more processors of a computing device, cause the one or more processors to perform acts comprising:
- obtaining a Web page navigated to by user input to the computing device;
- accessing a network search service to obtain previously gathered additional information regarding the Web page, the accessing including:
  - sending, to the network search service, a request for an indication of whether the network search service has additional information regarding the Web page,
  - receiving, from the network search service, the indication of whether the network search service has additional information regarding the Web page, and
  - displaying, in response to the network search service having additional information regarding the Web page, an additional information indication indicating that additional information regarding the Web page is available;
- accessing a digital assistant to obtain previously gathered additional information regarding the user;
- presenting, by the Web browser, the Web page; and
- presenting, by the Web browser, the previously gathered additional information regarding the Web page and the user with the Web page.

19. The computer-readable storage medium of claim 18, the acts further comprising:
- receiving user selection of the additional information indication; and
- obtaining, in response to user selection of the additional information indication, the previously gathered additional information regarding the Web page.

20. The computer-readable storage medium of claim 18, the acts further comprising performing the obtaining, the accessing the network search service, the accessing the digital assistant, the presenting the Web page, and the presenting the previously gathered additional information regarding the Web page and the user for each different Web page that is navigated to by user input to the computing device.

* * * * *